Aug. 8, 1961   R. Q. WILLIAMS   2,995,167
NUT AND BOLT LOCK RING
Original Filed Feb. 17, 1955

INVENTOR,
ROGER Q. WILLIAMS

United States Patent Office 2,995,167
Patented Aug. 8, 1961

2,995,167
NUT AND BOLT LOCK RING
Roger Q. Williams, 343 Foothill Blvd., San Leandro, Calif.
Original application Feb. 17, 1955, Ser. No. 489,003, now Patent No. 2,833,172, dated May 6, 1958. Divided and this application Feb. 27, 1958, Ser. No. 718,097
1 Claim. (Cl. 151—5)
(Granted under Title 35, U.S. Code (1952), sec. 266)

The invention described herein may be manufactured and used by or for the Government of the United States of America for governmental purposes without the payment of any royalties thereon or therefor.

The present invention relates to lock ring installation tongs and more particularly to tongs having two jaws so constructed and arranged that they are adapted to cooperate with a special type of lock ring to force the ring into proper position for installation on a nut and bolt assembly. This application is a division of U.S. patent application Serial No. 489,003, filed on February 17, 1955, issued as U.S. Patent No. 2,833,172 on May 6, 1958.

In many mechanical applications, nut and bolt assemblies are subjected to various forces such as friction, vibration, centrifugal force and so forth which tend to loosen the nut on the bolt. As a consequence, various devices have been provided for preventing the nut from becoming loose on the bolt. Prior art devices for this purpose have employed cotterpins, tapered split pins, gang-type of safety wire threaded through the castellations of nuts and into holes provided in the bolts, and other similar devices. Such prior art devices have proven disadvantageous since they do not satisfactorily withstand vibrations, shock loads and especially the stress of passing through viscous fluids such as oil or grease.

Accordingly, a new type of lock ring has been developed for the above purpose. This new lock ring consists of a novel shaped spring member which is adapted to remain securely in place about a nut and has a tongue portion which passes through the castellations of the nut into a cooperating hole in the bolt for maintaining the nut in position on the bolt at all times. This lock ring has proven very satisfactory in service and has overcome the limitations found in prior art devices; however, assembly of the lock ring has created a special problem since it must be forced into operative position relative to the nut and bolt in order to be properly assembled.

Consequently, a new type of tongs has been developed according to the aforementioned patent for mounting this type of lock ring in operative position.

The invention tongs employ a novel arrangement whereby the lock ring is maintained securely in place and which enables the lock ring to be distorted into the proper position such that it may be inserted in a nut and bolt assembly. The tongs thereby provide a means whereby the lock ring may be quickly and efficiently installed in a nut and bolt assembly.

An object of the present invention is the provision of new and novel lock ring for installation on a castellated nut and bolt assembly.

Other objects and many of the attendant advantages of this invention will be readily appreciated as the same becomes better understood by reference to the following detailed description when considered in connection with the accompanying drawings wherein.

Figure 1:
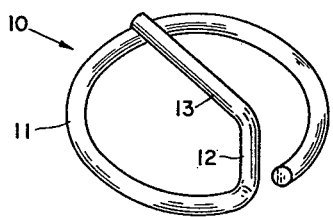
FIG. 1 is an isometric view of a special type of lock ring according to the invention.
Figure 3:
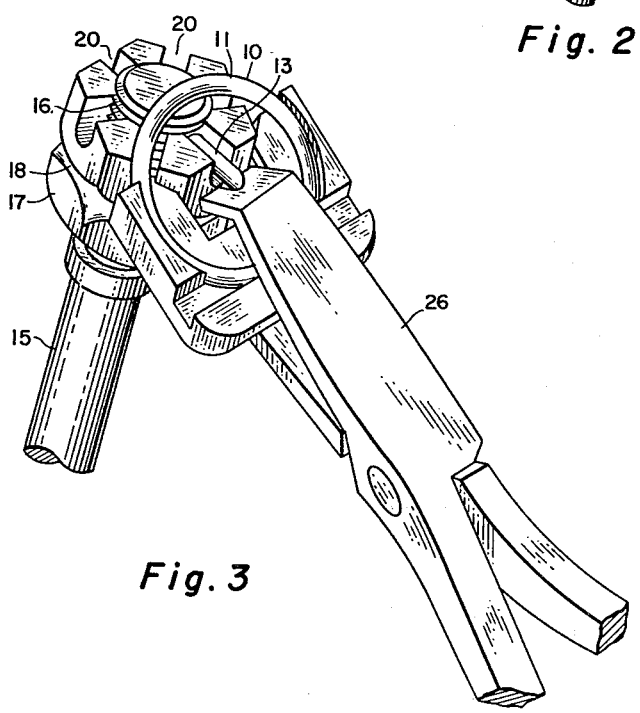
FIG. 3 is a view showing the lock ring being mounted on a nut and bolt assembly with the aid of the invention tongs.

Referring now to the drawings wherein like reference characters designate like or corresponding parts throughout the several views, there is shown in FIG. 1 a new type of lock ring 10 which consists of a unitary piece of resilient material such as spring steel or the like having a substantially circular portion 11 one end of which has an upwardly extending portion 12 which is bent at a 90° angle to the plane of portion 10 and terminates in a second bent portion or tongue which is bent at a 90° angle to portion 12 and extends diametrically inward of circular portion 10 in a plane parallel thereto. It should be noted that the length of the tongue is substantially equal to the inner diameter of the circular portion of the lock ring whereby the tongue is adapted to extend entirely through a bolt and engage cooperating openings in diametrically opposite portions of a nut mounted thereon. In addition, the length of tongue 13 must be greater than the length of offset portion 12 to enable the tongue to be depressed by the tool through circular portion 11, as illustrated in FIG. 3.

Figure 2:
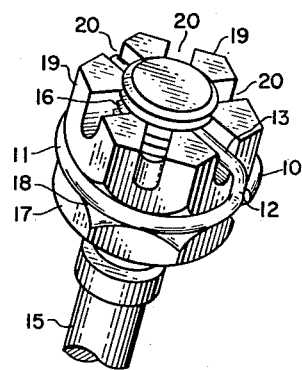
FIG. 2 is an isometric view of the lock ring in position on a nut and bolt assembly.

Referring now to FIG. 2, there is shown a nut and bolt assembly including a bolt 15 having a threaded end portion 16 and a nut 17 threaded thereon. The nut has a circumferential groove 18 formed therearound and a plurality of castellations 19 are formed on the upper portion of the nut, each castellation having a groove 20 formed diametrically therethrough. Circular portion 11 of the lock ring seats tightly in groove 18, the portion 12 of the lock ring extending longitudinally along the outer periphery of the nut, and the tongue 13 of the lock ring extending through diametrically opposite grooves 20 formed in the nut and a cooperating hole (not shown) formed diametrically through the bolt and aligned with the grooves. It is evident that the lock ring provides a means whereby the nut is securely locked on the bolt and the assembly is enabled to withstand the various forces to which it may be subjected without causing the nut to loosen on the bolt.

It is apparent that the lock ring must be distorted in order for it to be assembled as shown in FIG. 2 in a nut and bolt assembly. Referring now to FIG. 3, the lock ring is shown in position within the jaws of the novel tongs 26, wherein tongue 13 of the lock ring has been forced downwardly below the plane of circular portion 11 of the lock ring such that tongue 13 may be inserted through one of the grooves 20 and into the aligned hole in the bolt. When the tongue of the lock ring is so inserted, portion 11 of the lock ring lies across the top of the nut and bolt assembly as shown in FIG. 3 whereupon the tongs are removed and the lock ring forced over the far end of the nut by the use of a thin, elongated instrument such as an ice pick or the like, and the lock ring slides down along the outer surface of the nut into groove 18.

Obviously many modifications and variations of the present invention are possible in the light of the above teachings. It is therefore to be understood that within the scope of the appended claim the invention may be practiced otherwise than as specifically described.

I claim:

A locking device suitable for high vibration and shock loads, comprising a castellated nut threaded to a bolt having a transversely drilled aperture adjacent one end and spaced therefrom, said aperture being aligned with opposing castellations on the nut, said nut having an external circumferential groove lying in a transverse plane offset in a direction toward the other end of the bolt from a plane containing the drilled aperture and opposed castallation, a unitary resilient lock ring having a substantially completely circular split-ring portion disposed in said groove in clamping relation, one end of the split-ring portion in a free condition having an upstanding leg of a length equal to the offset between said planes, said leg portion terminating in a tongue portion extending substantially parallel to the split-ring portion, the length of the tongue portion being greater than the length of the leg portion, said tongue portion being of a length substantially the diameter of said split-ring portion so as to extend completely through the drilled aperture in said bolt and to engage the opposing castellations of the nut to provide a positive locking of the nut to the bolt, said tongue being canted with respect to the split-ring portion to resiliently engage the wall of the drilled aperture.

References Cited in the file of this patent

UNITED STATES PATENTS

| | | |
|---|---|---|
| 1,084,642 | Kiper | Jan. 20, 1914 |
| 1,641,489 | Hood | Sept. 6, 1927 |

FOREIGN PATENTS

| | | |
|---|---|---|
| 28,251 | Great Britain | Dec. 23, 1903 |
| 267,103 | Italy | Aug. 26, 1929 |
| 586,816 | Great Britain | Apr. 1, 1947 |